US012579670B2

(12) United States Patent
Walsh et al.

(10) Patent No.: US 12,579,670 B2
(45) Date of Patent: Mar. 17, 2026

(54) LASER SCAN DATA MODELING WITH SPARSE DATASETS

(71) Applicant: LEICA GEOSYSTEMS AG, Heerbrugg (CH)

(72) Inventors: Gregory Walsh, Walnut Creek, CA (US); Krishnendu Shekhar, San Ramon, CA (US)

(73) Assignee: LEICA GEOSYSTEMS AG, Heerbrugg (CH)

( * ) Notice: Subject to any disclaimer, the term of this patent is extended or adjusted under 35 U.S.C. 154(b) by 293 days.

(21) Appl. No.: 18/544,056

(22) Filed: Dec. 18, 2023

(65) Prior Publication Data

US 2025/0200774 A1    Jun. 19, 2025

(51) Int. Cl.
| | |
|---|---|
| *G06K 9/00* | (2022.01) |
| *G06T 7/11* | (2017.01) |
| *G06T 7/521* | (2017.01) |
| *G06T 7/62* | (2017.01) |
| *G06T 7/73* | (2017.01) |

(52) U.S. Cl.
CPC ................ *G06T 7/521* (2017.01); *G06T 7/11* (2017.01); *G06T 7/62* (2017.01); *G06T 7/74* (2017.01); *G06T 2207/10028* (2013.01); *G06T 2207/20021* (2013.01); *G06T 2207/20221* (2013.01)

(58) Field of Classification Search
CPC ... G06T 7/521; G06T 7/11; G06T 7/62; G06T 7/74; G06T 2207/10028; G06T 2207/20021; G06T 2207/20221; G06T 7/12
See application file for complete search history.

(56) References Cited

U.S. PATENT DOCUMENTS

2024/0369346 A1 * 11/2024 Yang ......................... G06T 7/73

FOREIGN PATENT DOCUMENTS

| | | | | | |
|---|---|---|---|---|---|
| CN | 109446951 A | * | 3/2019 | ............. | G06N 3/084 |
| CN | 115330966 A | * | 11/2022 | ............. | G06T 17/05 |
| GB | 2597517 A | * | 2/2022 | ............. | G06T 15/20 |

* cited by examiner

*Primary Examiner* — Xin Jia
(74) *Attorney, Agent, or Firm* — MASCHOFF BRENNAN

(57) ABSTRACT

A method may include obtaining three-dimensional coordinate points and a two-dimensional image representing an environment and objects in the environment. The method may include segmenting the image into image segments and obtaining a pixel selection in the image. The method may include generating an image segment frustum corresponding to a particular image segment shape that includes the pixel. The method may include intersecting the image segment frustum with the coordinate points to determine a subset of the three-dimensional coordinates used to fit a derived surface. The derived surface may represent a three-dimensional volume having a surface shape corresponding to the shape of the image segment frustum and may include a subset of three-dimensional coordinate points that intersects with the image segment frustum. The method may include generating a derived three-dimensional coordinate point that represents a surface point included in the environment within a volume of the derived surface.

24 Claims, 9 Drawing Sheets

FIG. 3

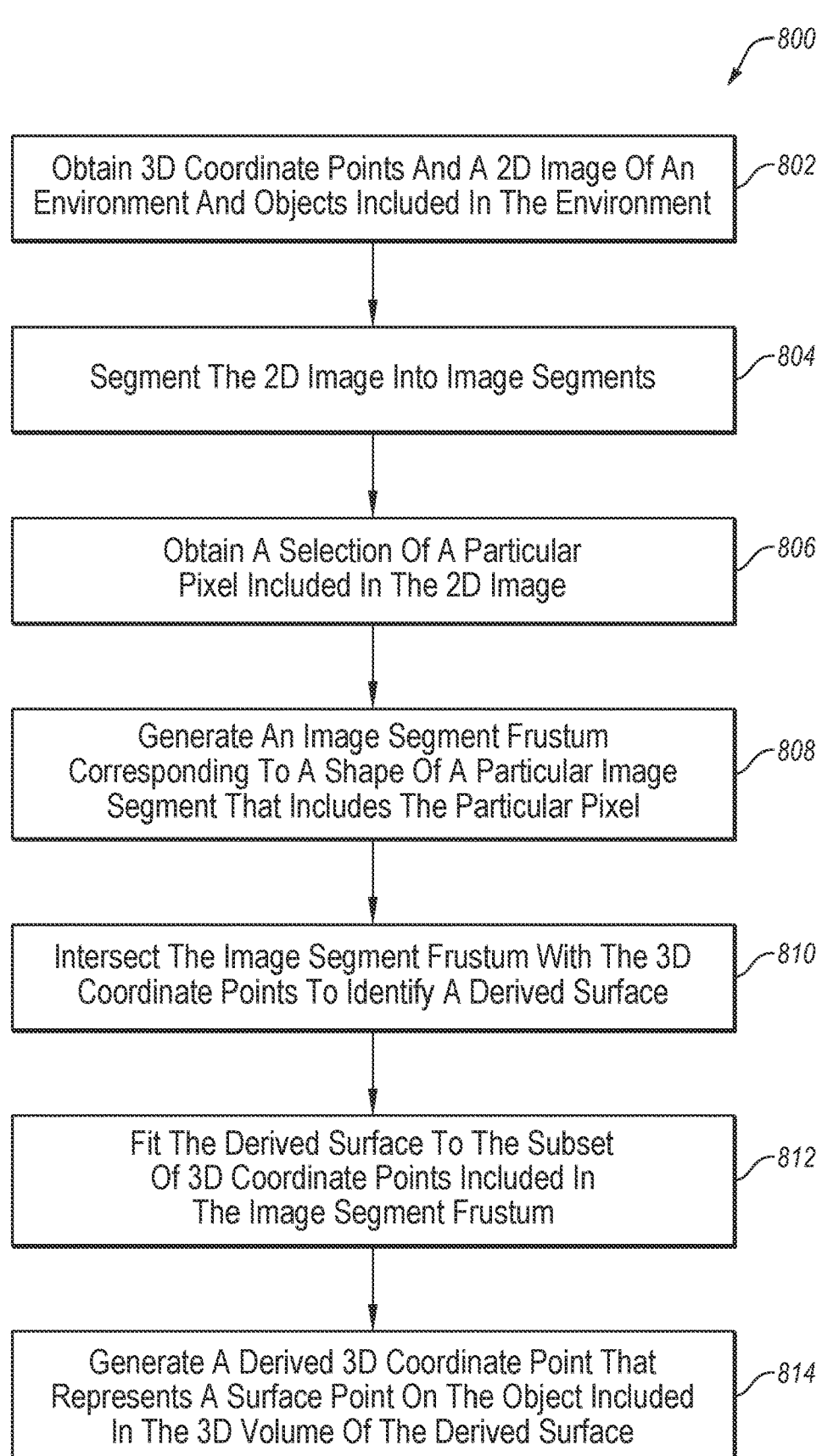

*800*

Obtain 3D Coordinate Points And A 2D Image Of An Environment And Objects Included In The Environment ⌐802

Segment The 2D Image Into Image Segments ⌐804

Obtain A Selection Of A Particular Pixel Included In The 2D Image ⌐806

Generate An Image Segment Frustum Corresponding To A Shape Of A Particular Image Segment That Includes The Particular Pixel ⌐808

Intersect The Image Segment Frustum With The 3D Coordinate Points To Identify A Derived Surface ⌐810

Fit The Derived Surface To The Subset Of 3D Coordinate Points Included In The Image Segment Frustum ⌐812

Generate A Derived 3D Coordinate Point That Represents A Surface Point On The Object Included In The 3D Volume Of The Derived Surface ⌐814

*FIG. 8*

LASER SCAN DATA MODELING WITH SPARSE DATASETS

The present disclosure generally relates to modeling laser scan data with sparse datasets.

BACKGROUND

A laser scanner may be used to spatially analyze a three-dimensional space by collecting information about objects and environments in the three-dimensional space. The laser scanner may be configured to emit a laser beam at an object or any other surface, such as by guidance from a user, and receive a corresponding reflected laser beam. The time taken for the reflected laser beam to be received by the laser scanner may be used to measure a distance between the laser scanner and the point from which the laser beam was reflected. By measuring the distances between the laser scanner and multiple different reflection points, shapes of objects and the environment surrounding the laser scanner may be estimated. The environment surrounding the laser scanner and the objects in the environment may be represented as three-dimensional coordinate measurements so that the data about the environment and the objects may be quantitatively analyzed.

Laser scanners are typically used alongside other environment-surveying tools, such as cameras that are configured to collect two-dimensional data about the same environment in which the laser scanner is operating. The accompanying images captured by the cameras may provide additional information about the three-dimensional coordinate measurements captured by the laser scanner. For example, colors associated with a particular section of the two-dimensional image data captured by the camera may be imparted to a corresponding subset of the three-dimensional coordinate measurements captured by the laser scanner based on similar positional information between the two-dimensional and the three-dimensional data to provide a more detailed three-dimensional representation of the environment and objects in the environment.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining three-dimensional coordinate points representing an environment and objects in the environment and a two-dimensional image of the environment and objects. The method may include segmenting the image into image segments and obtaining a pixel selection in the image. The pixel selected may form a frustum volume identified as the union of all rays originating from the camera nodal point and passing through the selected pixel. The pixel selection may belong to an image segment, and this image segment may form an image segment frustum. The image segment frustum may be identified as the union of the frustum volumes of each pixel in the image segment that contains the selected pixel. The image segment query may have an image segment frustum volume that contains a subset of the three-dimensional coordinate points. The method may include fitting a surface to the subset of the coordinate points included in the image segment frustum, assigning the coordinate points determined to be part of the surface in the subset to corresponding pixels of the particular image segment. For pixels without matching three-dimensional coordinate point, a point can be determined using the fitted surface.

In some embodiments, the method may further include pairing pixels included in an image segment corresponding to the image segment frustum to the subset of three-dimensional coordinate points and the derived three-dimensional coordinate point included in the derived surface, each pixel being paired with a respective three-dimensional coordinate point of the subset or the derived three-dimensional coordinate point.

In some embodiments, segmenting the two-dimensional image may include detecting a geometry of a particular image segment. The geometry may facilitate predicting a shape of an object corresponding to the particular image segment.

In some embodiments, the method may further include generating a histogram that tabulates distances of the sparse set of three-dimensional coordinate points from the nodal point of the camera. A peak included in the histogram may be identified in which the peak represents a concentration of three-dimensional coordinate points above a threshold of point concentration. The subset of three-dimensional coordinate points fitted to the derived surface may include three-dimensional coordinate points included in the peak.

In some embodiments, the method may further include identifying a first three-dimensional coordinate point included in the peak based on an observation time indicating at which time the first three-dimensional coordinate point is captured, the first three-dimensional coordinate point being included in the subset of three-dimensional coordinate points and the observation time differing by at least a threshold time period from an image observation time. The first three-dimensional coordinate point may be removed from the subset of three-dimensional coordinate points.

In some embodiments, the method may further include identifying a second three-dimensional coordinate point included in the peak based on a depth of the second three-dimensional coordinate point with respect to the nodal point of the camera, the second three-dimensional coordinate point being included in the subset of three-dimensional coordinate points. The second three-dimensional coordinate point may be removed from the subset of three-dimensional coordinate points responsive to determining that the depth of the second three-dimensional coordinate point is greater than a threshold depth value.

In some embodiments, the method may further include determining a respective measurement origin point corresponding to each respective three-dimensional coordinate point of the sparse set of three-dimensional coordinate points. The method may include computing a first vector of unit magnitude originating from the nodal point of the camera in a view direction of the camera and computing a second vector from a particular three-dimensional coordinate point relative to the respective measurement origin point corresponding to the particular three-dimensional coordinate point. The method may include computing a dot product of the first vector and the second vector and omitting the particular three-dimensional coordinate point corresponding to the second vector from the subset of three-dimensional coordinate points included in the image segment frustum responsive to the dot product being below a threshold value.

In some embodiments, the method may further include obtaining a second image segment frustum that includes a second subset of three-dimensional coordinate points fitted to a second image segment. The method may include identifying an intersecting region between the image segment frustum and the second image segment frustum by matching positions of one or more of the three-dimensional coordinate points included in the image segment frustum and one or more of the three-dimensional coordinate points included in the second image segment frustum. The method may include generating a combined image surface by merging the image segment frustum and the second image segment frustum based on the intersecting region.

According to an aspect of an embodiment, one or more non-transitory computer-readable storage media may be configured to store instructions that, in response to being executed, cause a system to perform operations. The operations may include obtaining three-dimensional coordinate points and a two-dimensional image representing an environment and objects in the environment. The operations may include segmenting the image into image segments and obtaining a pixel selection in the image. The operations may include generating an image segment frustum corresponding to a particular image segment shape that includes the pixel and intersecting the image segment frustum with the coordinate points to identify a derived surface. The operations may include fitting the derived surface to the coordinate points and generating a derived three-dimensional coordinate point that represents a surface point included in the environment within a volume of the derived surface.

In some embodiments, the operations may further include pairing pixels included in an image segment corresponding to the image segment frustum to the subset of three-dimensional coordinate points and the derived three-dimensional coordinate point included in the derived surface, each pixel being paired with a respective three-dimensional coordinate point of the subset or the derived three-dimensional coordinate point.

In some embodiments, segmenting the two-dimensional image may include detecting a geometry of a particular image segment. The geometry may facilitate predicting a shape of an object corresponding to the particular image segment.

In some embodiments, the operations may further include generating a histogram that tabulates distances of the sparse set of three-dimensional coordinate points from the nodal point of the camera. A peak included in the histogram may be identified in which the peak represents a concentration of three-dimensional coordinate points above a threshold of point concentration. The subset of three-dimensional coordinate points fitted to the derived surface may include three-dimensional coordinate points included in the peak.

In some embodiments, the operations may further include identifying a first three-dimensional coordinate point included in the peak based on an observation time indicating at which time the first three-dimensional coordinate point is captured, the first three-dimensional coordinate point being included in the subset of three-dimensional coordinate points and the observation time differing by at least a threshold time period from an image observation time. The first three-dimensional coordinate point may be removed from the subset of three-dimensional coordinate points.

In some embodiments, the operations may further include identifying a second three-dimensional coordinate point included in the peak based on a depth of the second three-dimensional coordinate point with respect to the nodal point of the camera, the second three-dimensional coordinate point being included in the subset of three-dimensional coordinate points. The second three-dimensional coordinate point may be removed from the subset of three-dimensional coordinate points responsive to determining that the depth of the second three-dimensional coordinate point is greater than a threshold depth value.

In some embodiments, the operations may further include determining a respective measurement origin point corresponding to each respective three-dimensional coordinate point of the sparse set of three-dimensional coordinate points. The operations may include computing a first vector of unit magnitude originating from the nodal point of the camera in a view direction of the camera and computing a second vector from a particular three-dimensional coordinate point relative to the respective measurement origin point corresponding to the particular three-dimensional coordinate point. The operations may include computing a dot product of the first vector and the second vector and omitting the particular three-dimensional coordinate point corresponding to the second vector from the subset of three-dimensional coordinate points included in the image segment frustum responsive to the dot product being below a threshold value.

In some embodiments, the operations may further include obtaining a second image segment frustum that includes a second subset of three-dimensional coordinate points fitted to a second image segment. The operations may include identifying an intersecting region between the image segment frustum and the second image segment frustum by matching positions of one or more of the three-dimensional coordinate points included in the image segment frustum and one or more of the three-dimensional coordinate points included in the second image segment frustum. The operations may include generating a combined image surface by merging the image segment frustum and the second image segment frustum based on the intersecting region.

According to an aspect of an embodiment, a system may include one or more processors and one or more non-transitory computer-readable storage media may be configured to store instructions that, in response to being executed, cause a system to perform operations. The operations may include obtaining three-dimensional coordinate points and a two-dimensional image representing an environment and objects in the environment. The operations may include segmenting the image into image segments and obtaining a pixel selection in the image. The operations may include generating an image segment frustum corresponding to a particular image segment shape that includes the pixel and intersecting the image segment frustum with the coordinate points to identify a derived surface. The operations may include fitting the derived surface to the coordinate points and generating a derived three-dimensional coordinate point that represents a surface point included in the environment within a volume of the derived surface.

In some embodiments, the operations may further include pairing pixels included in an image segment corresponding to the image segment frustum to the subset of three-dimensional coordinate points and the derived three-dimensional coordinate point included in the derived surface, each pixel being paired with a respective three-dimensional coordinate point of the subset or the derived three-dimensional coordinate point.

In some embodiments, segmenting the two-dimensional image may include detecting a geometry of a particular image segment. The geometry may facilitate predicting a shape of an object corresponding to the particular image segment.

In some embodiments, the operations may further include generating a histogram that tabulates distances of the sparse set of three-dimensional coordinate points from the nodal point of the camera. A peak included in the histogram may be identified in which the peak represents a concentration of three-dimensional coordinate points above a threshold of point concentration. The subset of three-dimensional coordinate points fitted to the derived surface may include three-dimensional coordinate points included in the peak.

In some embodiments, the operations may further include identifying a first three-dimensional coordinate point included in the peak based on an observation time indicating at which time the first three-dimensional coordinate point is captured, the first three-dimensional coordinate point being included in the subset of three-dimensional coordinate points and the observation time differing by at least a threshold time period from an image observation time. The first three-dimensional coordinate point may be removed from the subset of three-dimensional coordinate points.

In some embodiments, the operations may further include identifying a second three-dimensional coordinate point included in the peak based on a depth of the second three-dimensional coordinate point with respect to the nodal point of the camera, the second three-dimensional coordinate point being included in the subset of three-dimensional coordinate points.

The second three-dimensional coordinate point may be removed from the subset of three-dimensional coordinate points responsive to determining that the depth of the second three-dimensional coordinate point is greater than a threshold depth value.

In some embodiments, the operations may further include determining a respective measurement origin point corresponding to each respective three-dimensional coordinate point of the sparse set of three-dimensional coordinate points. The operations may include computing a first vector of unit magnitude originating from the nodal point of the camera in a view direction of the camera and computing a second vector from a particular three-dimensional coordinate point relative to the respective measurement origin point corresponding to the particular three-dimensional coordinate point. The operations may include computing a dot product of the first vector and the second vector and omitting the particular three-dimensional coordinate point corresponding to the second vector from the subset of three-dimensional coordinate points included in the image segment frustum responsive to the dot product being below a threshold value.

In some embodiments, the operations may further include obtaining a second image segment frustum that includes a second subset of three-dimensional coordinate points fitted to a second image segment. The operations may include identifying an intersecting region between the image segment frustum and the second image segment frustum by matching positions of one or more of the three-dimensional coordinate points included in the image segment frustum and one or more of the three-dimensional coordinate points included in the second image segment frustum. The operations may include generating a combined image surface by merging the image segment frustum and the second image segment frustum based on the intersecting region.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

6

BRIEF DESCRIPTION OF THE DRAWINGS

Example embodiments will be described and explained with additional specificity and detail through the accompanying drawings in which:

FIG. 3 is a diagram of an example embodiment of an operating environment for generating coordinate-synchronized images according to one or more embodiments of the present disclosure.

FIG. 8 is a flowchart of an example method of generating coordinate-synchronized images according to one or more embodiments of the present disclosure.

DETAILED DESCRIPTION

Figure 1:
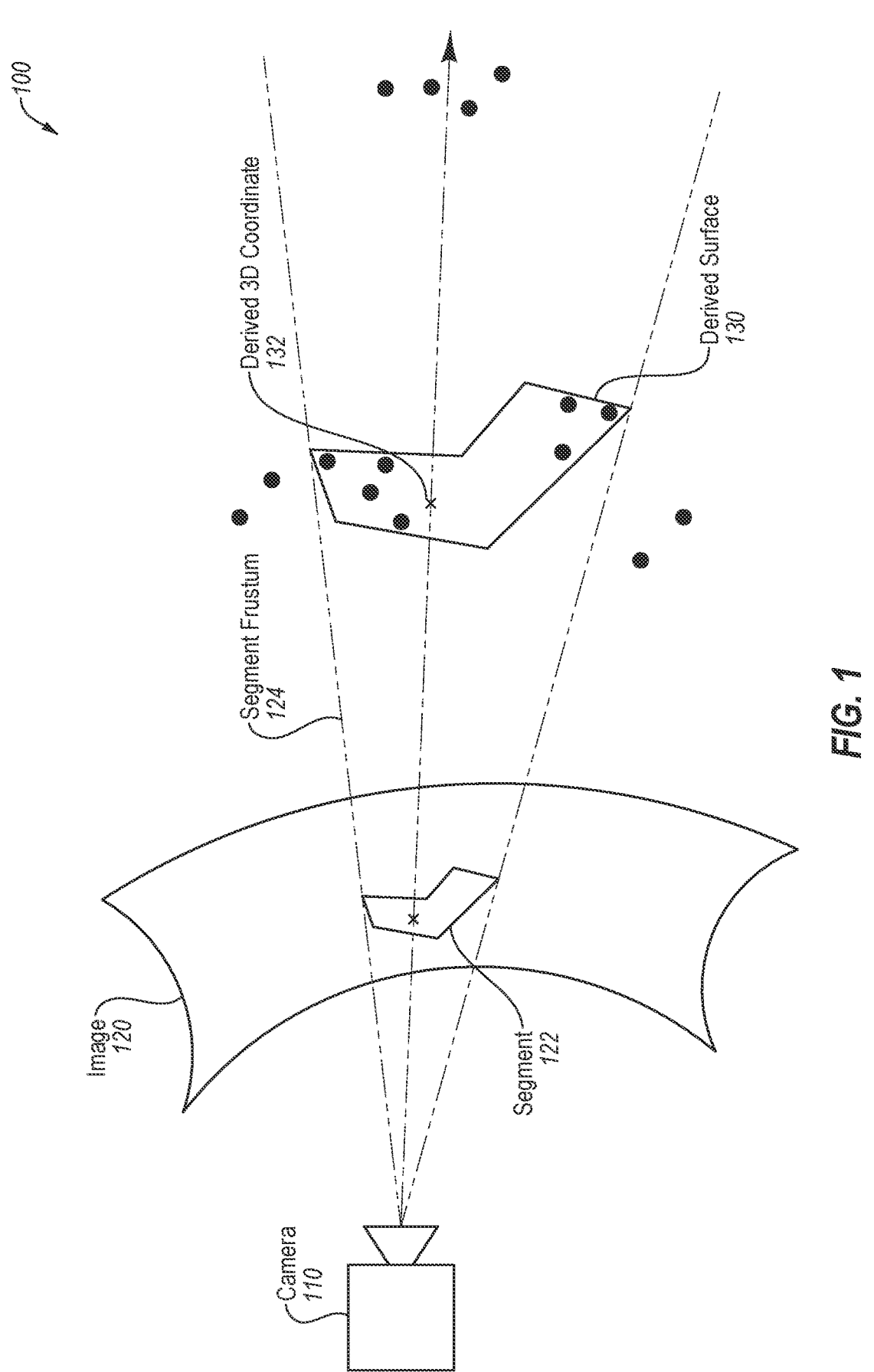
FIG. 1 illustrates an example embodiment of an operating environment for determining a derived surface according to one or more embodiments of the present disclosure.

Laser scanners typically operate using arrays of lasers such that multiple data points may be collected simultaneously. Because a single laser scan datum only captures a small point in a particular environment, increasing the number of lasers used to capture data or the speed at which the laser scan data is processed may result in faster mapping of the three-dimensional environment. In some situations, three-dimensional laser scan data may represent a sparse dataset that does not fully map the three-dimensional environment surrounding the laser scanner because too many data points captured from multiple perspectives are needed to accurately represent the entirety of the surrounding environment. The speed at which laser scan data points are collected may be limited by the power of the laser beam emitted by the laser scanner and accompanying issues regarding eye safety that may be caused by using more powerful laser beams. Consequently, there may be a limit to how quickly laser scan data may be captured by a single laser scanner device.

To further increase the speed at which a three-dimensional environment may be measured, two-dimensional image data may be used to supplement gaps in the three-dimensional laser scan data captured by the laser scanner. Two-dimensional image data, however, may lack depth information about the environment, which may prevent identification of objects located within the environment. Although the three-dimensional laser scan data may provide insight regarding the ranges corresponding to the objects in the environment, the laser scan data may be too sparse to reliably identify some or even most of the objects included in two-dimensional image data.

Consequently, there is a need for a process that facilitates scanning a three-dimensional space and accurately imaging the objects located within the three-dimensional space with a only sparse dataset of three-dimensional laser scan data available. Existing methods of three-dimensional object identification may involve comparing two or more two-dimensional images with known camera calibrations using processes such as stereo dense matching or photogrammetry. Such existing methods, however, typically involve capturing image data or laser scan data from multiple perspectives or require that the collected laser scan data be relatively dense. Given a sparser collection of laser scan data or an insufficient number of perspectives, such methods may fail to accurately capture information regarding objects located within a particular environment.

The present disclosure describes, among other things, a system and method of modeling laser scan data, represented by three-dimensional coordinate points, associated with an environment as three-dimensional objects with a sparse dataset of laser scan data. The system and the method of modeling the laser scan data according to the present disclosure may involve segmenting one or more calibrated two-dimensional images, captured together with a set of three-dimensional coordinate data, into multiple image segments. A particular three-dimensional coordinate point may be selected in the segmented images (e.g., by a user analyzing the environment), and an image segment in which the particular three-dimensional coordinate point is located may be identified.

An image segment frustum that represents a portion of a camera viewing range corresponding in shape and proportional in size to the image segment may be generated. In other words, the image segment frustum may represent a portion of a segmented two-dimensional image as viewed from a nodal point of the camera that captured the segmented two-dimensional image with the image segment frustum having the shape of a particular image segment that includes a particular selected pixel or other point. The image segment frustum may be visualized as the union of all rays originating from the camera nodal point that extend through the image segment in which the particular selected pixel or other point is located.

A three-dimensional surface (referred to herein as "the derived surface") may be derived from three-dimensional points inside the image segment frustum. The derived surface may represent part of the surface of a three-dimensional volume shape corresponding to the selected image segment. The three-dimensional coordinate points used to find the derived surface corresponding to the image segment may be included in the derived surface. In sparse datasets of three-dimensional coordinate points, the derived surface may only include a small number of three-dimensional coordinate points. Additional three-dimensional coordinate points not initially captured by one or more laser scans, referred to herein as "derived three-dimensional coordinate points", may be generated and included in the derived surface to provide additional information about objects included in the portion of the environment represented by the image segment. Additionally or alternatively, three-dimensional coordinate points corresponding to occluded surfaces and objects included in the images may be mapped to the appropriate surfaces by comparing vectors formed between a nodal point of a camera used to capture the two-dimensional images and the three-dimensional coordinate points to disambiguate different overlapping surfaces.

By mapping the derived surface to the two-dimensional image and generating derived three-dimensional coordinate points within the derived surface, objects included in the environment represented by the two-dimensional image may be better paired with three-dimensional coordinate points such that three-dimensional information is made available for the two-dimensional objects. For example, pixels included in the two-dimensional image may be paired with corresponding three-dimensional coordinate points, adding texture and depth information about the environment represented in the two-dimensional image even when only a sparse dataset of three-dimensional coordinate points is captured with respect to the environment.

Embodiments of the present disclosure are explained with reference to the accompanying figures.

FIG. 1 illustrates an example embodiment of an operating environment 100 for estimating an image surface according to one or more embodiments of the present disclosure. The environment 100 may include a camera 110 that is configured to capture a two-dimensional ("2D") image 120, which may be composed of multiple image segments 122. A surface including multiple three-dimensional ("3D") coordinate points 132 corresponding to the derived surface 130 may be determined with respect to a particular image segment 122.

The camera 110 may include any camera known in the art that captures photographs or records digital video of any aspect ratio, size, frame rate, or some combination thereof. The camera 110 may include an image sensor that samples and records a field-of-view. The image sensor may, for example, include a charge-coupled device (CCD) or a complementary metal-oxide semiconductor (CMOS) sensor. The camera 110 may provide raw or compressed image data, which may be stored by a computer system as image files. The image data provided by the camera 110 may include still image data (e.g., photographs) or a series of frames linked together in time as video data. In the present disclosure, the term "image" may refer to image data, image files, the actual representation of a setting that may be captured in the image (e.g., the image itself), some combination thereof, or any other visual representations of an environment.

Although illustrated as a single camera 110, more than one camera 110 may be used to capture the image 120. For example, a first camera may include a limited aspect ratio and may not be suited for a capturing larger environment or subject such that a second camera, a third camera, or additional cameras may be used to fully capture an image or images of the environment or subject. Additionally or alternatively, more than one camera 110 may be used to capture images of the same environment or subject to provide images having different perspectives of the same environment or subject.

In some embodiments, the image or images captured by the camera 110 may be segmented via an image segmentation process in which related pixels included in the image are grouped together. For example, a simple linear iterative clustering (SLIC) image segmentation process may be implemented to identify groups of pixels by focusing on similarities and differences between pixels forming borders of objects included in the image. A given image may be segmented to generate multiple image segments. In some embodiments, larger images may be segmented into a larger number of image segments. Additionally or alternatively, the size of individual image segments may be increased for larger images rather than increasing the number of image segments.

Figure 2:
FIG. 2 illustrates an example image segmentation according to one or more embodiments of the present disclosure.

FIG. 2 illustrates an example image 200 being processed as several image segments according to one or more embodiments of the present disclosure. The image 200 may include a first image segment 215 within a first region 210 of the image 200 that generally includes a first color and a second image segment 225 within a second region 220 of the image 200 that generally includes a second color. The first region 210 may include several image segments that are similar to the first image segment 215, while the second region 220 may include several image segments that are similar to the second image segment 225. In some embodiments, the first image segments 215 may be generated based on similarities or differences between groups of pixels. Additionally or alternatively, the first image segments 215 may be generated such that each image segment is the same or a substantially similar size relative to other image segments.

An interface 230 between the first region 210 and the second region 220 may indicate where a change between pixels in the image 200 is detected. In some embodiments, changes in color values may provide a metric for distinguishing between different shapes (e.g., of objects) included in the image 200. Additionally or alternatively, the changes in color values may provide a metric for distinguishing between different parts of the same object, lighting changes, aberrations with the image 200 (e.g., warping, blurring, or other image-distorting effects), or some combination thereof. As illustrated in FIG. 2, the change between pixels is represented as a color change between the first region 210 and the second region 220. In the image 200, for example, the interface 230 may represent the border between a wall represented by the first region 210 and a floor represented by the second region 220. The contrast in color between the first region 210 and the second region 220 at the interface 230 may facilitate identifying the border between the wall and the floor. Additionally or alternatively, the pixels included in a particular first image segment 215 may have the same or similar color values within a threshold difference such that the pixels are included in the same image segment 215.

In some embodiments, a geometry corresponding to a particular image segment may be identified. In some situations, the geometry may be identified before segmentation of a particular image. For example, it may be known before segmentation of an image that the image includes a chair, a door, a pipe, a table, some other object, or some combination thereof. Additionally or alternatively, the geometry may be identified after segmentation of the particular image and before further processing of the particular image or the image segments. The geometry may facilitate predicting a shape of an object corresponding to the particular image segment, which may simplify downstream classification processes involving 3D coordinate points collected by scanner systems and the particular image. For example, a particular dataset may include an image segment that includes pipe for which a cylindrical geometry is predicted (e.g., by a neural network or any other object identification process). Given the geometry of the pipe, 3D coordinate points associated with the image segment may be fitted according to the cylindrical geometry rather than being fitted based only on a distribution of 3D coordinate points. Consequently, objects inside of a 2D image may be identified with fewer 3D coordinate points being referenced.

Returning to the description of FIG. 1, an image segment frustum 124 may be generated with respect to the image segment 122. In some embodiments, the image segment frustum may be defined as the union of all rays which originate from the nodal point of the camera and pass through any pixel contained in the image segment 122. In other words, the image segment frustum may represent a three-dimensional section of a viewing range of the camera 110 that corresponds in shape and is approximately proportional in size to the image segment 122 with respect to the image 120. The image segment frustum 124 may also include a limit on depth to remove points beyond a certain range. The image segment frustum 124 may be a 3D shape that represents a cross-section corresponding to a cone, a pyramid, a cylinder, or any other 3D figure. In some embodiments, the image segment frustum 124 may include a cross-sectional shape that corresponds to the 2D shape of the image segment 122 and be extruded along a ray corresponding to the image segment 122. Three-dimensional coordinates contained inside the image segment frustum may intersect a ray originating from the nodal point of the camera which then passes through a particular pixel in the image segment 122.

The result of fitting the image segment frustum 124 to the image 120, labeled as the derived surface 130, may facilitate improved mapping of 3D spatial coordinate points corresponding to the same environment as the image 120 captured by the camera 110. Commonly used algorithms such as random sample consensus (RANSAC) can be applied to determine the derived surface 130 and to divide the 3D spatial coordinates between those belonging to the derived surface 130 and those not belonging to the derived surface 130. The 3D coordinate points captured in the same environment may or may not fully populate the area covered by the image segment 122. Some of the 3D coordinate points may or may not be sparsely collected with respect to the overall environment corresponding to the image 120, and 3D coordinate points corresponding to surfaces behind the image segment 122 may be contained in the image segment frustum 124 defined by the image segment 122. For any pixel in the image segment 122, a corresponding ray can be intersected with the derived surface 130 to form a derived 3D coordinate point 132. By projecting each pixel of the image segment 122 to the derived surface 130, which may include a larger but proportional volume relative to the surface area covered by the image segment 122, a greater number of 3D coordinate points 132 may be derived from the 3D coordinate points captured with respect to the image 120. Thus, selecting a particular derived 3D coordinate point 132 in the region covered by the derived surface 130 is more likely to result in selection of the derived surface 130 rather than any points along the same ray as the particular derived 3D coordinate point 132 but in a different plane. Consequently, mapping the derived 3D coordinate points 132 to the derived surface 130 may provide a more reliable pairing between 3D coordinate points and a particular portion of the image 120 than mapping raw 3D coordinate points corresponding to the image 120 to the image segment 122 because introducing the derived 3D coordinate points 132 increases the number of 3D coordinate points located within the derived surface 130.

Modifications, additions, or omissions may be made to the environment 100 without departing from the scope of the present disclosure. For example, the designations of different elements in the manner described is meant to help explain concepts described herein and is not limiting. For instance, in some embodiments, camera 110, the image 120, the image segment 122, the image segment frustum 124, the derived surface 130, and the derived 3D coordinate points 132 are delineated in the specific manner described to help with explaining concepts described herein but such delineation is not meant to be limiting. Further, the environment 100 may include any number of other elements or may be implemented within other systems or contexts than those described.

Figure 3:
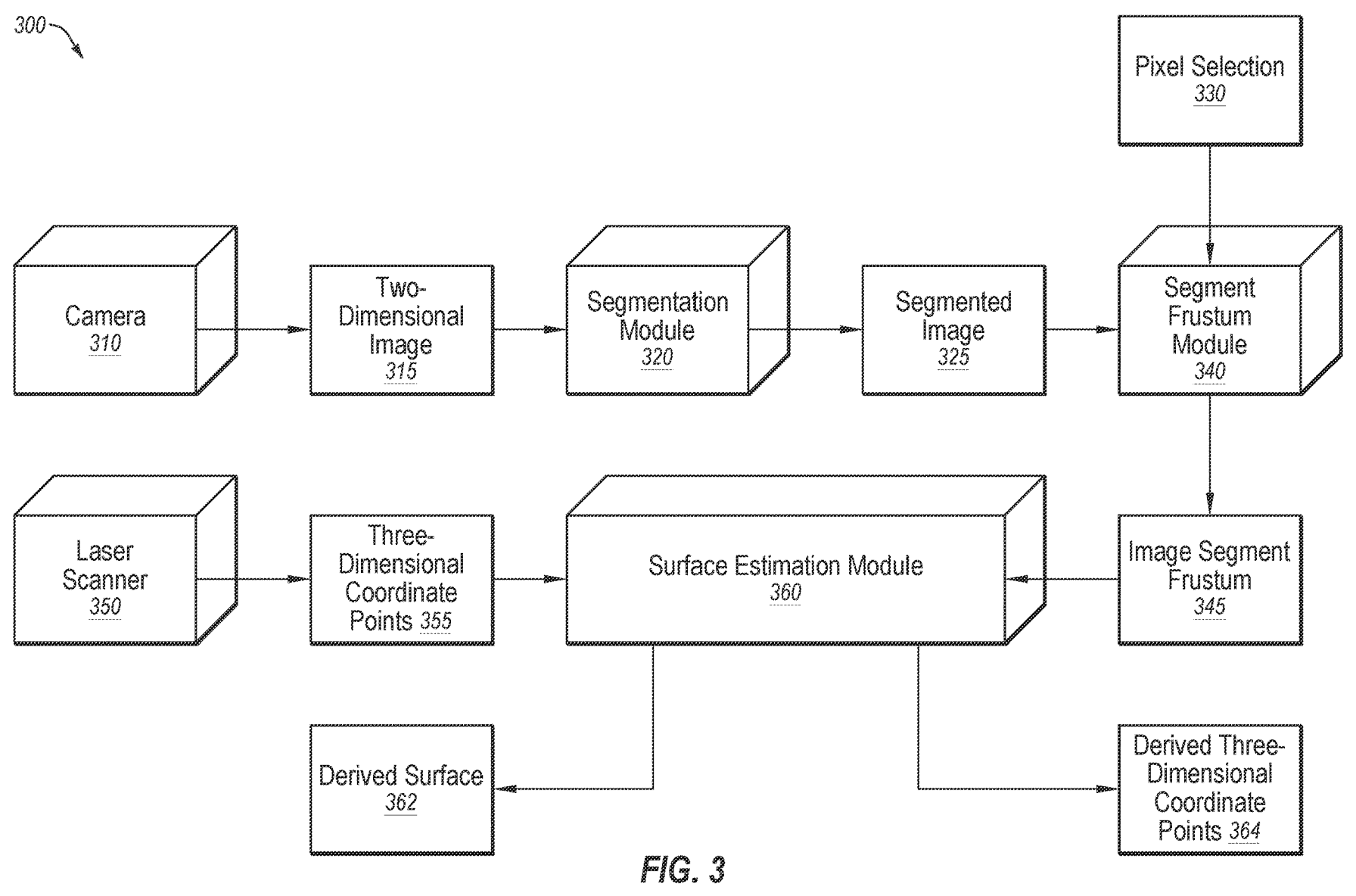

FIG. 3 is a diagram of an example embodiment of an operating environment 300 for generating coordinate-synchronized images according to one or more embodiments of the present disclosure. Performing operations in the environment 300 may facilitate synchronizing 3D coordinate points to one or more 2D images captured in the same environment and generating a derived three-dimensional coordinate point 364. The environment 300 may involve a segmentation module 320 processing a 2D image 315 captured by a camera 310 to generate a segmented image 325. A segment frustum module 340 may be configured to formulate an image segment frustum 345 based on the segmented image 325 and a pixel selection 330. A derived surface estimation module 360 may be configured to obtain the image segment frustum 345, in combination with corresponding 3D coordinate points 355 captured by a laser scanner 350 and generate a derived surface 362 and the derived three-dimensional coordinate point 364.

In some embodiments, the camera 310, the segmentation module 320, the segmentation frustum module 340, the laser scanner 350, and/or the derived surface estimator module 360 (collectively referred to herein as "the computing modules") may include code and routines configured to enable a computing system to perform one or more operations. Additionally or alternatively, one or more of the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to the two-dimensional image 315, the segmented image 325, the pixel selection 330, the image segment frustum 345, the three-dimensional coordinate points 355, and/or the derived three-dimensional coordinate point 364 as described in further detail below and in relation to an example method 800 as described with respect to FIG. 8.

The segmentation module 320 may obtain the 2D image 315 captured by the camera 310, which may be the same as or similar to the camera 110 and generate the segmented image 325. In some embodiments, the segmentation module 320 may perform operations corresponding to the environment 100 described in relation to FIG. 1 to generate the segmented image 325, which may include image segments that are the same as or similar to the image segment 122 described in relation to FIG. 1.

The segmented image 325 and a pixel selection 330 corresponding to the 2D image 315 may be obtained by the segment frustum module 340. In some embodiments, the pixel selection 330 may be made by a user to specify a particular point included in the 2D image 315. In these and other embodiments, the pixel selection 330 may represent a particular image segment included in the segmented image 325 that is of interest to the user. Based on the pixel selection 330 and the segmented image 325, the segment frustum module 340 may be configured to output an image segment frustum 345 that specifies the particular image segment to which the pixel selection 330 corresponds. In other words, the image segment frustum 345 in the context of the environment 100 may specify the image segment 122 as illustrated in FIG. 1 as being the selected image segment for projecting the image segment frustum 124.

The laser scanner 350 may include a beam-emitting element, a beam-receiving element, or a beam-transceiving element that, in tandem with a timer, facilitates determining the distance between the laser scanner 350 and a point in the environment from which the emitted laser beam is reflected. The laser scanner 350 may provide 3D coordinate points 355 corresponding to the distances between the laser scanner 350 and a particular point in the environment. Each instance of a laser beam being emitted by the laser scanner 350 may correspond to a different point in the environment. The 3D coordinate points 355 corresponding to each of the different points in the environment may be computed based on the time elapsed between emitting the laser beam and receiving a reflectance response. In some embodiments, the laser scanner 350 may provide 3D coordinate data as a series of numerical values or as a table of coordinates (e.g., a table relating an identifier of a point in the environment to x-coordinate, y-coordinate, and z-coordinate values of the point). In the present disclosure, the term "coordinate point" and "3D coordinate point" may refer to coordinate data, files that include all or some of the coordinate data, some combination thereof, or any other representations of three-dimensional positional information.

The derived surface estimation module 360 may be configured to intersect the image segment frustum 345 and 3D coordinate points 355 captured by the laser scanner 350. The derived surface estimation module 360 may estimate a derived surface 362 corresponding to the shape of the image segment specified in the image segment 325. The derived surface 362 can then be used to estimate the derived 3D coordinates 364.

In some embodiments, fitting the 3D coordinate points 355 to the enlarged surface may involve a quadric surface fitting process that uses a random sampling consensus (RANSAC) algorithm to identify and discard outliers among 3D coordinate points 355. Additionally or alternatively, an image segment finder process may be used to fit the 3D coordinate points 355 to the enlarged surface. A semantic image segment finder process involving identifying an object originally included in the image segment from which the enlarged surface was determined may be implemented. Fitting the 3D coordinate points 355 according to an image segment frustum of the identified object may be facilitated after identifying the object according to the semantic image segment finder process. For example, a cylindrical surface fitter may be used upon identifying a pipe-shaped object, and a planar surface fitter may be used upon identifying a floor, a wall, or any other substantially flat object.

After determining the image segment frustum to be used in fitting the 3D coordinate points 355, a particular 3D coordinate point may be assigned to a corresponding pixel of the fitted surface. In some embodiments, a ray associated with a particular pixel may be intersected with the fitted surface and a corresponding 3D coordinate point 355 to generate an association between the particular pixel and the 3D coordinate point 355.

Additionally or alternatively, the derived surface estimation module 360 may process additional or alternative image segment frustums 345 to synchronize different image segments of the 2D image 315 with respective 3D coordinate points 355 to generate the derived three-dimensional coordinate point 364. Synchronizing different image segments may be facilitated as described in further detail in relation to an operating environment 700 of FIG. 7.

Modifications, additions, or omissions may be made to the environment 300 without departing from the scope of the present disclosure. For example, the designations of different elements in the manner described is meant to help explain concepts described herein and is not limiting. For instance, in some embodiments, the two-dimensional image 315, the segmented image 325, the pixel selection 330, the image segment frustum 345, the three-dimensional coordinate points 355, and the derived three-dimensional coordinate point 364 are delineated in the specific manner described to help with explaining concepts described herein but such delineation is not meant to be limiting. Further, the environment 300 may include any number of other elements or may be implemented within other systems or contexts than those described.

Figure 4:
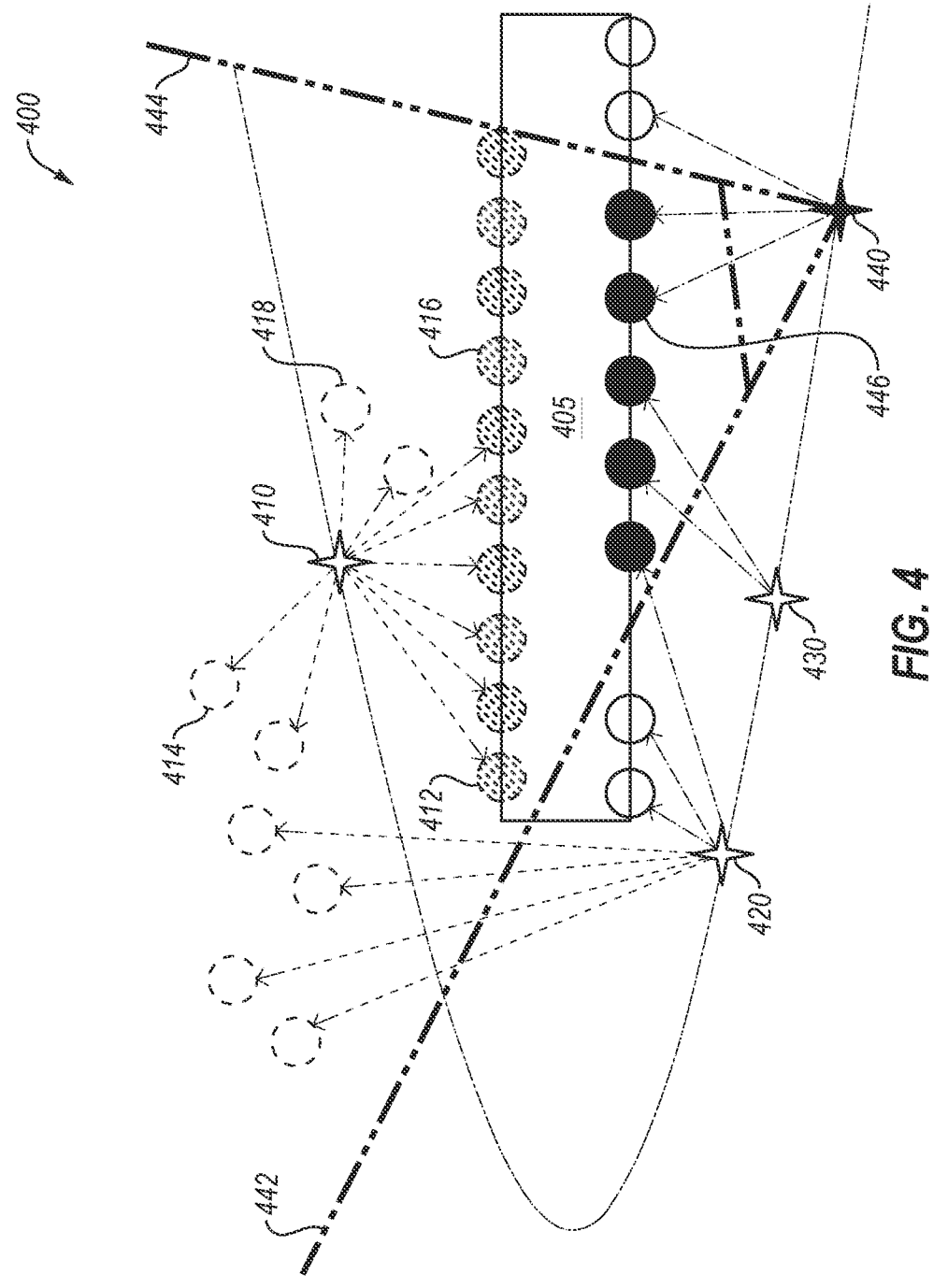
FIG. 4 illustrates an example embodiment of an operating environment for determining a derived surface of an object having one or more occluded surfaces according to one or more embodiments of the present disclosure.

FIG. 4 illustrates an example embodiment of an operating environment 400 for estimating an image surface of an object having one or more occluded surfaces according to one or more embodiments of the present disclosure. The module for derived surface estimation may use RANSAC and may additionally or alternatively use the geometry and time bounds described subsequently to decrease the number of points used in the surface estimation. The environment 400 may include an object 405 that is scanned by a first laser scanner located at a first position 410, a second laser scanner located at a second position 420, a third laser scanner located at a third position 430, and a fourth laser scanner located at a fourth position 440. Additionally or alternatively, the object 405 may be scanned by a single laser scanner that is moved between the first position 410, the second position 420, the third position 430, and the fourth position 440, in any sequence. In some embodiments, a time limit or a source limit may be applied to limit the number of 3D coordinate points used to estimate the surface in addition to the vector analysis and histogram methods described below. The environment 400 may facilitate removal of redundant coordinate points captured by two or more different laser scanners or a single laser scanner positioned at different locations in a particular environment.

In some embodiments, a laser scanner at the first position 410 may detect 3D coordinate points in the environment 400 in a scanning range depending on the location of the first position 410 and a field of view of the laser scanner. For example, a field of view of a particular laser scanner located at the fourth position 440 is illustrated as being bound between a first boundary 442 and a second boundary 444. As illustrated, the laser scanner at the fourth position 440 may be configured to capture 3D coordinate points within the space between the first boundary 442 and the second boundary 444. The field of view of a laser scanner may be increased by placing an additional laser scanner unit oriented at a different angle at the fourth position 440 or at any other positions. Additionally or alternatively, the field of view of the laser scanner may be increased by rotating the laser scanner during its operation such that 3D coordinate points outside of the space bound by the first boundary 442 and the second boundary 444 may be scanned from the rotated perspective of the laser scanner.

In some embodiments, scanning the object 405 from different perspectives and locations, such as the first through fourth positions 410, 420, 430, and 440, may result in capturing 3D coordinate points associated with different surfaces of the object 405. For example, the laser scanner at the first position 410 may capture a first 3D coordinate point 412 that represents a point on a surface of the object 405. The laser scanner at the first position 410 may additionally or alternatively capture a second 3D coordinate point 414 that may be associated with a different object not illustrated in the environment 400 or that may correspond to random noise.

The laser scanner at the first position 410 may capture a third 3D coordinate point 416 along the same surface as the first 3D coordinate point 412 at a different location from the first 3D coordinate point 412. In some embodiments, the laser scanner at the fourth position 440 may capture a fourth 3D coordinate point 446 within the field of view of the laser scanner at location 440. In these and other embodiments, capturing laser scanned 3D coordinate points from different perspectives may result in capturing redundant 3D coordinate points corresponding to the same object 405. As illustrated in FIG. 4, the fourth position 440 may be situated such that a laser scanner located at the fourth position 440 and facing the object 405 views a surface of the object 405 that is opposite to the surface viewed from the first position 410 while facing the object 405. Capturing multiple 3D coordinate points associated with the same object 405 from different angles may result in noisy data collection and increased difficulty of accurately selecting or categorizing 3D coordinate points as belonging to a particular object 405 or a particular surface of the object 405.

Although described as the first position 410, the second position 420, the third position 430, and the fourth position 440, an order in which 3D coordinate points are captured may not necessarily be sequential or chronological with respect to the positions 410, 420, 430, and 440. Additionally or alternatively, an order in which 3D coordinate points are captured may not necessarily be sequential or chronological with respect to description of the first 3D coordinate point 412, the second 3D coordinate point 414, the third 3D coordinate point 416, the fourth 3D coordinate point 446, a fifth 3D coordinate point 418, or any other 3D coordinate points.

In some embodiments, redundant 3D coordinate points may be identified and removed using a vector analysis of the 3D coordinate points captured by the one or more laser scanners located at the first through fourth positions 410, 420, 430, and 440. For example, the first 3D coordinate point 412, the third 3D coordinate point 416, and the fourth 3D coordinate point 446 may correspond to points located on surfaces of the object 405. In situations in which the object 405 is selected from the viewpoint of the fourth position 440, the fourth 3D coordinate point 446 may be considered responsive to the selection while the first 3D coordinate point 412 and the third 3D coordinate point 416 may be considered non-responsive or redundant relative to the fourth 3D coordinate point 446.

To determine that the first 3D coordinate point 412 and/or the third 3D coordinate point 416 may be omitted from consideration as redundant points relating to the object from the viewpoint of the scanner located at the position 440 facing the object 405, confirming that the first 3D coordinate point 412 and the third 3D coordinate point 416 are associated with one or more occluded surfaces of the object 405 may be beneficial. In some embodiments, whether a particular 3D coordinate point is redundant with respect to the fourth 3D coordinate point 446 may be determined by analyzing a directionality of a vector corresponding to a particular 3D coordinate point and scanner location pair. Each 3D coordinate point captured by a laser scanner at a particular location and orientation may include a vector component connecting the 3D coordinate point to the laser scanner. Captured 3D coordinate points having vector components with the same or similar directionalities within a threshold tolerance range may be considered as corresponding to the same object 405. For example, a vector representing the fourth 3D coordinate point 446 with respect to the fourth position 440 may include nearly opposite directionality as a vector representing the third 3D coordinate point 416 with respect to the first position 410. Because the third 3D coordinate point 416 and the fourth 3D coordinate point 446 have nearly opposite directionality relative to the same fourth position 440, the third 3D coordinate point 416 may be omitted responsive to the object 405 being selected (e.g., by a user) when determining a surface from the fourth position 440.

The directionality of 3D coordinate points captured by different laser scanners or from different positions may be compared with respect to a single position to remove any 3D coordinate points outside of a specified tolerance range of directions. As illustrated in the environment 400, for example, the directionality of the third 3D coordinate point 416 may be computed with respect to the fourth position 440 despite the third 3D coordinate point 416 being captured by a laser scanner located at the first position 410. Assuming the locations of the first position 410 and the fourth position 440 are known, a vector directionality of the third 3D coordinate point 416 relative to the fourth position 440 rather than or in addition to the first position 410 may be computed.

Additionally or alternatively, comparing the directionality of vectors may facilitate identifying 3D coordinate points associated with noise or other objects distinct from the object 405, which may be similarly omitted from consideration in the selection of the object 405. For example, the fifth 3D coordinate point 418 may be computed as having a directionality that is sufficiently different from the vector directions of the fourth 3D coordinate point 446 with respect to the scanner location 440 which may indicate that the fifth 3D coordinate point 418 may be omitted from consideration responsive to the object 405 being selected.

Taking the fourth 3D coordinate point 446 as an additional or alternative example, the dot product of a first vector from the fourth 3D coordinate point 446 to its scan location at the fourth position 440 and a second vector from the fourth 3D coordinate point 446 to a different scan location, such as the third position 430, may be a positive value because the third position 430 and the fourth position 440 are on the same side of the object 405. The dot product of the first vector and a third vector from the third 3D coordinate point 416 to the first position 410, however, may result in a negative value because the fourth position 440 and fourth 3D coordinate point 446 are on opposite sides of the object 405 with respect to the first position 410 and the third 3D coordinate point 416. In some embodiments, a threshold value of the dot product may be set such that dot products greater than the threshold value may indicate that two vectors corresponding to two potentially different 3D coordinate points are captured from different scan locations within a particular tolerance range of scan directions such that the two potentially different 3D coordinate points may fall on the same surface of the object. Additionally or alternatively, dot products less than the threshold value may indicate that the two 3D coordinate points are captured from substantially different directions, which may indicate that the two 3D coordinate points correspond to different surfaces or even different objects.

In some embodiments, determining and comparing the directionalities of two or more 3D coordinate points with respect to the vector generated by passing a ray from the nodal point of the camera through the center of the selected pixels corresponding to the 3D coordinate points may be facilitated by generating respective vectors between a scanner location and the 3D coordinate points and computing a dot product between two or more generated vectors and the pixel ray.

Figure 5:
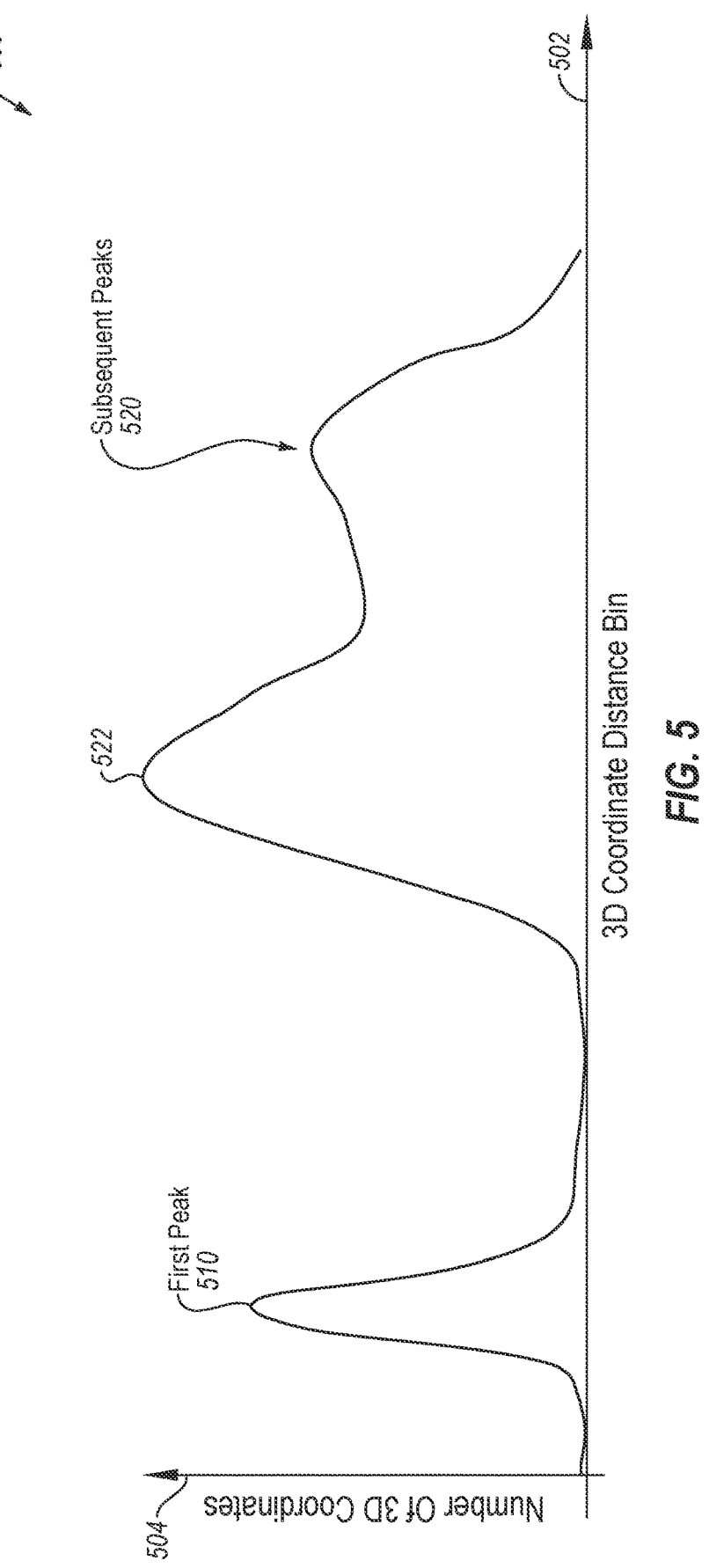
FIG. 5 illustrates an example histogram of three-dimensional coordinate points according to one or more embodiments of the present disclosure.

Additionally or alternatively, redundant data points corresponding to occluded surfaces may be omitted by estimating whether a first laser scan data point and a second laser scan data point correspond to one another. FIG. 5 illustrates an example distance histogram 500 of three-dimensional coordinate points according to one or more embodiments of the present disclosure. The histogram 500 represents a 3D coordinate point count 504 as a function of 3D distance 502 between the laser scanner and the surface from which the 3D coordinate points are captured. As illustrated, the 3D coordinate points corresponding to a first peak 510 may represent points captured from a surface closer to the laser scanner relative to the 3D coordinate points corresponding to subsequent peaks 520, which may represent points captured from surfaces farther away from the laser scanner. The heights of the first peak 510 and of the subsequent peaks 520 may indicate the number of 3D coordinate points detected at the corresponding distances. As such, taller peaks representing denser concentrations of detected points at a particular distance may correspond to larger surfaces. For example as illustrated in the histogram 500, the first peak 510 may represent a first concentration of 3D coordinate points within a first threshold distance away from a nodal point of a camera, and the subsequent peaks 520 may represent concentrations of 3D coordinate points at different threshold distances away from the nodal point of the camera. Particularly noticeable peaks in the histogram 500, such as the secondary peak 522, may represent a particular concentration of 3D coordinate points a second threshold distance away from the nodal point of the camera.

The histogram 500 may illustrate a graphical depiction of 3D coordinate points corresponding to a first surface of an object, represented by the first peak 510; 3D coordinate points corresponding to a second surface of the object, represented by the subsequent peaks 520 and in particular the secondary peak 522; and 3D coordinate points corresponding to occluded objects, represented by the subsequent peaks. In some embodiments, the representation of the 3D coordinate points in terms of the 3D distance 502 may be dependent on a viewpoint from which the histogram 500 is generated. For example, the histogram 500 representing 3D coordinate points associated with the object 405 in the environment 400 may be from the perspective of the fourth position 440, in which case the fourth 3D coordinate point 446 may be included as part of the first peak 510, the third 3D coordinate point 416 may be included as part of the secondary peak 522, and the fifth 3D coordinate point 418 may be included as part of the subsequent peaks 520. As an additional or alternative example, the histogram 500 representing 3D coordinate points associated with the object 405 from the perspective of the first position 410 may involve the third 3D coordinate point 416 and the fourth 3D coordinate point 446 representing the first peak 510 and the secondary peak 522, respectively.

In some embodiments, combining detection of occluded surfaces, such as via the histogram 500 and/or the vector directionality analysis associated with the environment 400, with a surface estimation process as described in relation to FIGS. 1-3 may improve the accuracy of computing derived 3D coordinate points. Using the histogram 500 alone to detect occluded surfaces may or may not be accurate in every environment. Oblique or otherwise tilted surfaces may include 3D coordinate points that gradually change in 3D distance, while thin surfaces may include 3D coordinate points that fall within the same histogram peak. Consequently, applying the vector directionality analysis with the 3D distance information provided by the histogram 500 may facilitate more accurate removal of redundant or occluded 3D coordinate points. Additionally or alternatively, combining an image segmentation process according to one or more embodiments of the present disclosure with the removal of redundant 3D coordinate points via the vector directionality analysis may increase the number of 3D coordinate points omitted via the vector directionality analysis.

Additionally or alternatively, 3D coordinate points included in an environment represented by the histogram 500 may be omitted or otherwise excluded from analyses according to other properties of the 3D coordinate points. For example, 3D coordinate points included in the first peak 510 may be filtered based on observation times corresponding to the 3D coordinate points. In some embodiments, each 3D coordinate point may include an observation time that indicates when the 3D coordinate point was captured. In these and other embodiments, the observation times of the 3D coordinate points may be compared to an observation time corresponding to capture of a 2D image of the same environment. Responsive to the observation time of a particular 3D coordinate point differing from the observation time of the 2D image by at least a threshold time period, it may be concluded that the particular 3D coordinate point was captured at a different time than the 2D image. Consequently, the particular 3D coordinate point may be omitted from further analyses (e.g., removing the particular 3D coordinate point from the subset of 3D coordinate points included in the first peak 510) because the time difference between capturing the particular 3D coordinate point and the 2D image may result in discrepancies despite both pieces of information relating to the same environment.

Additionally or alternatively, a depth filter may be applied to the 3D coordinate points to remove particular 3D coordinate points from further analyses. For example, a first 3D coordinate point included in the first peak 510 may include a first depth value corresponding to the 3D distance 502 labeled in the histogram 500, while a second 3D coordinate point included in the subsequent peaks 520 includes a second depth value that is greater than the first depth value. Setting a threshold depth value greater than the first depth value but less than the second depth value may facilitate removing either the first or the second 3D coordinate points. Additionally or alternatively, the threshold depth value may be set at a depth value that excludes some 3D coordinate points from the 3D coordinate points included in first peak 510.

Figure 6:
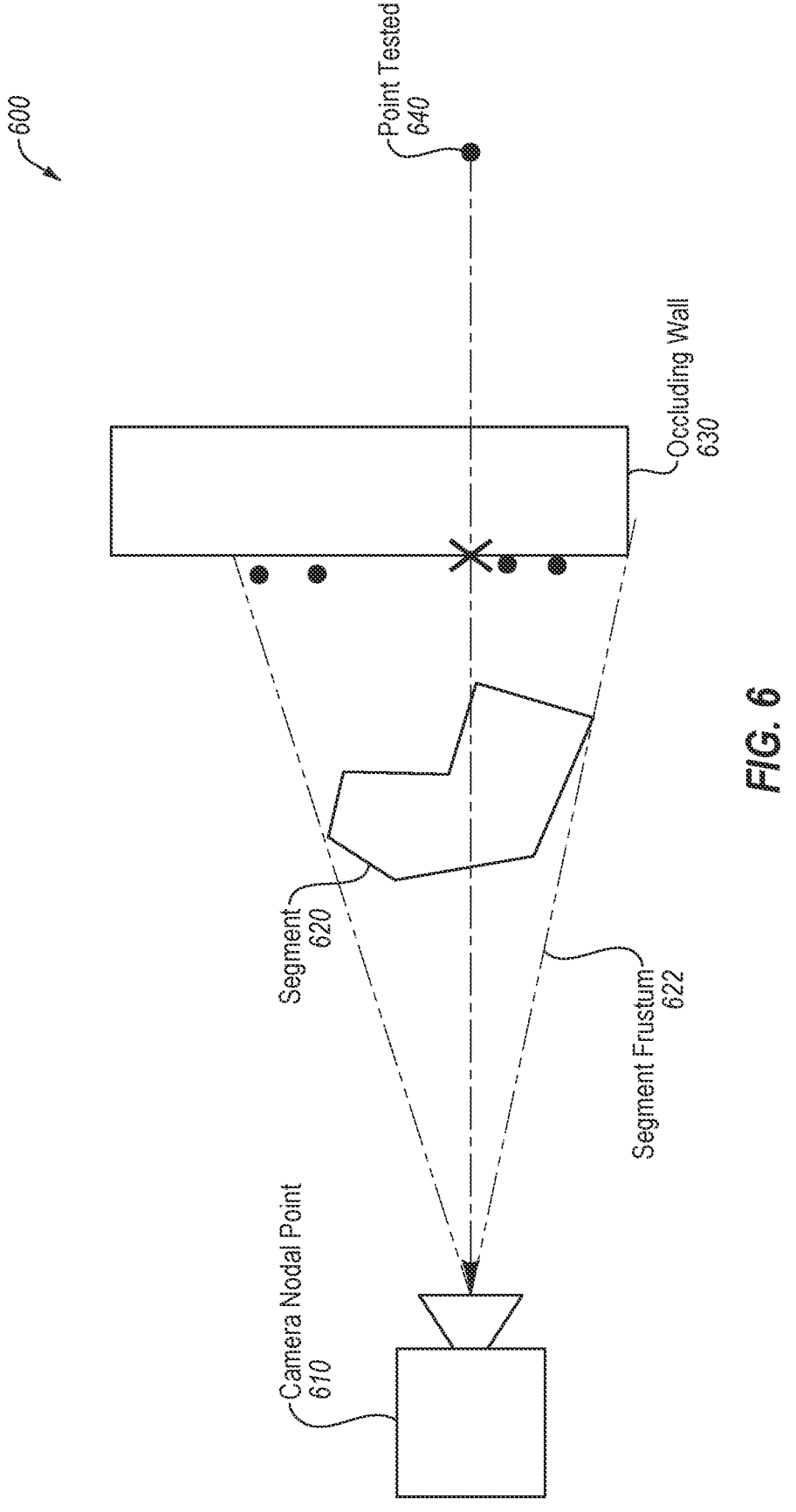
FIG. 6 illustrates an example embodiment of an operating environment for evaluating an occluded tested point according to one or more embodiments of the present disclosure.

FIG. 6 illustrates an example embodiment of an operating environment 600 for evaluating an occluded tested point 640 according to one or more embodiments of the present disclosure. In some embodiments, a pixel may be selected (e.g., by a user) to specify a space of interest as described in relation to the pixel selection 330 of FIG. 3. Point clouds of 3D coordinate points, however, may not inherently include recognition and/or identification of surfaces. As such, 3D coordinate points displayed on a two-dimensional visual medium to a user may or may not indicate a depth of the 3D coordinate points without selecting a particular 3D coordinate point or region, which may or may not cause 3D coordinate points associated with occluded objects to be harder to distinguish from 3D coordinate points associated with occluding objects.

As illustrated in the environment 600, the tested point 640 may be an occluded coordinate point behind an occluding wall 630. An image segment 620 may be selected in relation to the tested point 640, and an image segment frustum 622 may be fitted to an image projection from a camera nodal point 610. A set of 3D coordinate points 624 corresponding to the occluding wall 630 may be identified based on the image segment frustum 622. In addition to the set of 3D coordinate points 624 on the occluding wall 630, one or more occluded 3D coordinate points, such as the tested point 640, may be detected.

In some embodiments, the tested point 640 may be identified as an occluded point rather than as a point associated with the occluding wall 630 by comparing a depth of the tested point 640 to a threshold depth value. The threshold depth value may be determined from the derived surface 130 or alternately based on depths associated with a majority of the detected 3D coordinate points, positional information regarding known objects in the environment 600, user specifications, some combination thereof, or any other threshold depth value specification process. In the environment 600, for example, the threshold depth value may be set to correspond with the depth of a derived surface 130 of the occluding wall 630 that is the closest to the camera nodal point 610. As an additional or alternative example, the threshold depth value may be set to correspond with the depth of the derived surface 130 of the occluding wall 630 because a majority of the 3D coordinate points detected in the environment 600, and in particular the set of 3D coordinate points 624, are located at approximately the same or similar depths with respect to the camera nodal point 610. Responsive to determining that the tested point 640 includes a depth that is greater than the threshold depth value, the tested point 640 may be classified as an occluded point relative to the image segment frustum 622 and the occluding wall 630.

Figure 7:
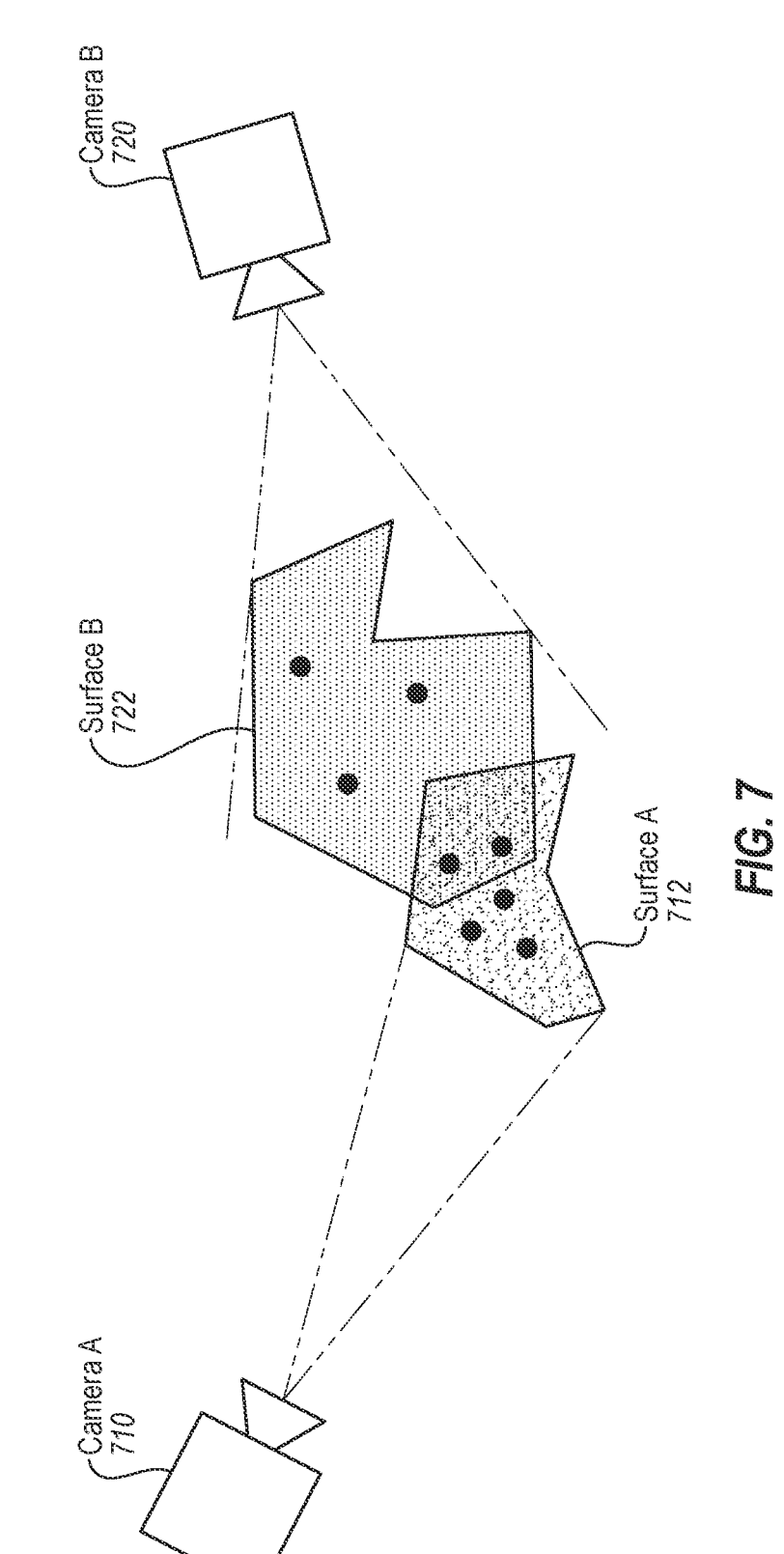
FIG. 7 illustrates an example embodiment of an operating environment for merging two or more derived image surfaces according to one or more embodiments of the present disclosure.

FIG. 7 illustrates an example embodiment of an operating environment 700 for merging two or more derived image surfaces according to one or more embodiments of the present disclosure. The environment 700 may include a first camera 710 that observes a first image derived surface 712 and a second camera 720 that observes a second image derived surface 722. In some embodiments, the first camera 710 and the second camera 720 may be oriented to capture images relating to the same environment 700. Because of differences in orientation and/or hardware associated with the first camera 710 and the second camera 720, the two cameras 710 and 720 may capture images depicting different views and regions of an object in the environment 700 and/or images of the same object from different angles.

Applying an image segmentation process to the first camera 710 and the second camera 720 may respectively result in projection of the first image surface 712 and the second image surface 722. Depending on the fields of view of the first camera 710 and the second camera 720 and the sizes of the projected first image surface 712 and the second image surface 722, an intersecting region 730 in three-dimensional space between the first image surface 712 and the second image surface 722 may be formed. Three-dimensional coordinate points projected onto the first image surface 712 and 3D coordinate points projected onto the second image surface 722 may overlap in the intersecting region 730.

Identification of the intersecting region 730 may facilitate determining a spatial relationship between the first image surface 712 and the second image surface 722. Determining the spatial relationship between the image surfaces 712 and 722 may in turn facilitate identification of other co-located image segments, assessing visibility of particular 3D coordinate points included in the first image surface 712 and/or the second image surface 722, merging of the two image surfaces 712 and 722, or some combination thereof. In some embodiments, knowing how the image surfaces 712 and 722 are related via the 3D coordinate points included in the intersecting region 730 may facilitate the combination of the first image surface 712 with the second image surface 722 and formation of a larger combined image surface that includes a larger inlier set of 3D coordinate points.

Additionally or alternatively, occluded 3D coordinate points included in the larger combined image surface may be more accurately identified because the different perspectives of the first camera 710 and the second camera 720 may specify differing depths with respect to the observed 3D coordinate points included in each of the image surfaces 712 and 722. Thus, the 3D coordinate points included in the intersecting region 730 captured by the first camera 710 and the 3D coordinate points included in the intersecting region 730 captured by the second camera 720 may be compared with respect to their measured depths to determine the respective depths of the 3D coordinate points relative to the first camera 710 and/or the second camera 720.

FIG. 8 is a flowchart of an example method 800 of generating coordinate-synchronized images according to one or more embodiments of the present disclosure. The method 800 may be performed by any suitable system, apparatus, or device. For example, the camera 310, the segmentation module 320, the segment frustum module 340, the laser scanner 350, and/or the derived surface estimation module 360 of FIG. 3 may perform one or more operations associated with the method 800. Although illustrated with discrete blocks, the steps and operations associated with one or more of the blocks of the method 800 may be divided into additional blocks, combined into fewer blocks, or eliminated, depending on the particular implementation.

The method 800 may begin at block 802, where 3D coordinate points and a 2D image of an environment and objects included in the environment may be obtained. The 3D coordinate points may be captured by one or more laser scanners, and the 2D image may be captured by a camera. The laser scanners used to capture the 3D coordinate points may or may not be co-located with the camera such that the 3D coordinate points and the 2D image may be captured at different orientations relative to one another. In some embodiments, the laser scanners may only capture a sparse set of 3D coordinate points that represent the environment and one or more objects included in the environment. In these and other embodiments, the camera capturing the 2D image of the environment may be located at a predetermined and known position relative to the environment captured in the 2D image.

At block 804, the 2D image may be segmented into image segments. In some embodiments, the 2D image may be segmented according to a semantic segmentation process that groups related pixels of the 2D image into a same image segment. For example, a first group of pixels having the same or similar color values within a threshold range may be included in the same image segment, while a second group of pixels having color values that are different from the color values associated with the first group of pixels may be excluded from the image segment in which the first group of pixels are included.

At block 806, a selection of a particular pixel included in the 2D image may be obtained. In some embodiments, the selection of the particular pixel may involve a user selection of a particular image segment corresponding to the 2D image and/or a particular point included in the particular image segment. For example, the user selection may be performed by clicking on an image segment in a visual representation of the 2D image, such as via a graphical user interface on a computerized display.

At block 808, an image segment frustum corresponding to a shape of a particular image segment that includes the particular pixel may be generated. The image segment frustum may originate from a nodal point of the camera used to capture the 2D image, which corresponds to the predetermined and known position of the camera and extend towards the particular pixel selected in the 2D image.

At block 810, the image segment frustum may be intersected with the 3D coordinate points to identify a derived surface. The derived surface may represent a 3D volume having a surface shape corresponding to the shape of the image segment frustum. A subset of 3D coordinate points included in the intersection of the image segment frustum and the 3D coordinate points may be included within the 3D volume of the derived surface.

In some embodiments, a histogram that tabulates distances the 3D coordinate points from a nodal point of the camera may be generated. A first peak representing a first concentration of 3D coordinate points at the same or approximately similar distances away from the nodal point of the camera may be identified. Additionally or alternatively, a second peak representing a second concentration of 3D coordinate points at the same or approximately similar distances away from the nodal point may be identified. Whether the first peak or the second peak is closer to the nodal point may be determined to establish which 3D coordinate points may be included in the subset of 3D coordinate points to be fitted to the image segment frustum. For example, in embodiments in which the first concentration of 3D coordinate points is closer to the nodal point than the second concentration of 3D coordinate points is, the 3D coordinate points included in the second concentration may be excluded from the set of 3D coordinate points fitted to the image segment frustum.

At block 812, the derived surface may be fitted to the subset of 3D coordinate points. In some embodiments, a ray that originates from the position of the camera used to capture the 2D image and is directed towards a particular pixel may be paired with a corresponding 3D coordinate point of the subset to assign a 3D coordinate to the particular pixel. In some embodiments, a measurement origin point corresponding to each 3D coordinate point assigned to corresponding pixels of the 2D image may be determined, and a vector from each of the 3D coordinate points to a threshold normal plane relative to the measurement origin point may be computed. A dot product between a first vector associated selected pixel and a second vector associated with a second 3D coordinate point may be computed in which the second 3D coordinate point may be omitted from the subset responsive to determining that the dot product is below a threshold value.

At block 814, a derived 3D coordinate point that represents a surface point on an object included in the environment may be generated within the 3D volume of the derived surface. In some embodiments, generation of the derived 3D coordinate point may be facilitated by processes described above, such as in relation to the environment 100 of FIG. 1 or the environment 300 of FIG. 3.

Modifications, additions, or omissions may be made to the method 800 without departing from the scope of the disclosure. For example, the designations of different elements in the manner described is meant to help explain concepts described herein and is not limiting. Further, the method 800 may include any number of other elements or may be implemented within other systems or contexts than those described.

Figure 9:
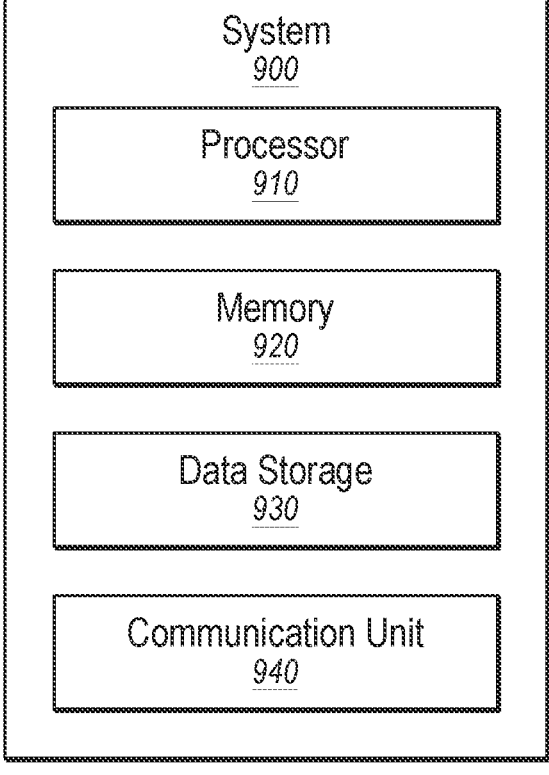
FIG. 9 is an example computing system.

FIG. 9 is an example computer system 900 according to one or more embodiments of the present disclosure. The computing system 900 may include a processor 910, a memory 920, a data storage 930, and/or a communication unit 940, which all may be communicatively coupled. Any or all of the environment 100 of FIG. 1, the environment 300 of FIG. 3, the environment 400 of FIG. 4, the environment 600 of FIG. 6, and/or the environment 700 of FIG. 7 may be implemented as a computing system consistent with the computing system 900.

Generally, the processor 910 may include any suitable special-purpose or general-purpose computer, computing entity, or processing device including various computer hardware or software modules and may be configured to execute instructions stored on any applicable computer-readable storage media. For example, the processor 910 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 9, it is understood that the processor 910 may include any number of processors distributed across any number of network or physical locations that are configured to perform individually or collectively any number of operations described in the present disclosure. In some embodiments, the processor 910 may interpret and/or execute program instructions and/or process data stored in the memory 920, the data storage 930, or the memory 920 and the data storage 930. In some embodiments, the processor 910 may fetch program instructions from the data storage 930 and load the program instructions into the memory 920.

After the program instructions are loaded into the memory 920, the processor 910 may execute the program instructions, such as instructions to cause the computing system 900 to perform the operations of the method 800 of FIG. 8. For example, the computing system 900 may execute the program instructions to obtain 3D coordinate points and a 2D image, segment the 2D image into image segments, obtain a selection of a particular pixel included in the 2D image, generate an image segment frustum, intersect the image segment frustum with the 3D coordinate points to identify a derived surface, fit the derived surface to the subset of 3D coordinate points included in the image segment frustum, and/or generate a derived 3D coordinate point included in the derived surface.

The memory 920 and the data storage 930 may include computer-readable storage media or one or more computer-readable storage mediums for having computer-executable instructions or data structures stored thereon. Such computer-readable storage media may be any available media that may be accessed by a general-purpose or special-purpose computer, such as the processor 910. For example, the memory 920 and/or the data storage 930 may include the two-dimensional image 315, the segmented image 325, the pixel selection 330, the image segment frustum 345, the three-dimensional coordinate points 355, and/or the derived three-dimensional coordinate point 364. In some embodiments, the computing system 900 may or may not include either of the memory 920 and the data storage 930.

By way of example, and not limitation, such computer-readable storage media may include non-transitory com-puter-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 910 to perform a particular operation or group of operations.

The communication unit 940 may include any component, device, system, or combination thereof that is configured to transmit or receive information over a network. In some embodiments, the communication unit 940 may communicate with other devices at other locations, the same location, or even other components within the same system. For example, the communication unit 940 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a Wi-Fi device, a Wi-Max device, cellular communication facilities, or others), and/or the like. The communication unit 940 may permit data to be exchanged with a network and/or any other devices or systems described in the present disclosure. For example, the communication unit 940 may allow the system 900 to communicate with other systems, such as computing devices and/or other networks.

One skilled in the art, after reviewing this disclosure, may recognize that modifications, additions, or omissions may be made to the system 900 without departing from the scope of the present disclosure. For example, the system 900 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   obtaining a sparse set of three-dimensional coordinate points representing an environment and an object included in the environment;
   obtaining a two-dimensional image of the environment that includes the object, the two-dimensional image being captured from a known position relative to the environment;
   segmenting the two-dimensional image into a plurality of image segments;
   obtaining a selection of a particular pixel included in the two-dimensional image;
   generating an image segment frustum with a shape corresponding to a particular image segment in which the particular pixel is located, the image segment frustum originating from a nodal point of a camera used to capture the two-dimensional image and extending towards the particular pixel from the predetermined and known position;
   intersecting the image segment frustum with the sparse set of three-dimensional coordinate points to determine a subset of the sparse three-dimensional coordinates used to fit a derived surface that represents a three-dimensional volume having a surface shape corresponding to the shape of the image segment frustum, the derived surface including a subset of three-dimensional coordinate points that intersects with the image segment frustum; and
   generating a derived three-dimensional coordinate point that represents a surface point on the object included in the environment within the three-dimensional volume of the derived surface.

2. The method of claim 1, further comprising pairing pixels included in an image segment corresponding to the image segment frustum to the subset of three-dimensional coordinate points and the derived three-dimensional coordinate point included in the derived surface, each pixel being paired with a respective three-dimensional coordinate point of the subset or the derived three-dimensional coordinate point.

3. The method of claim 1, wherein segmenting the two-dimensional image includes detecting a geometry of a particular image segment, the geometry facilitating predicting a shape of an object corresponding to the particular image segment.

4. The method of claim 1, further comprising:
   generating a histogram that tabulates distances of the sparse set of three-dimensional coordinate points from the nodal point of the camera; and
   identifying a peak included in the histogram, the peak representing a concentration of three-dimensional coordinate points above a threshold of point concentration,
   wherein the subset of three-dimensional coordinate points fitted to the derived surface includes three-dimensional coordinate points included in the peak.

5. The method of claim 4, further comprising:
   identifying a first three-dimensional coordinate point included in the peak based on an observation time indicating at which time the first three-dimensional coordinate point is captured, the first three-dimensional coordinate point being included in the subset of three-dimensional coordinate points and the observation time differing by at least a threshold time period from an image observation time; and
   removing the first three-dimensional coordinate point from the subset of three-dimensional coordinate points.

6. The method of claim 4, further comprising:
   identifying a second three-dimensional coordinate point included in the peak based on a depth of the second three-dimensional coordinate point with respect to the nodal point of the camera, the second three-dimensional coordinate point being included in the subset of three-dimensional coordinate points; and
   removing the second three-dimensional coordinate point from the subset of three-dimensional coordinate points responsive to determining that the depth of the second three-dimensional coordinate point is greater than a threshold depth value.

7. The method of claim 1, further comprising:
   determining a respective measurement origin point corresponding to each respective three-dimensional coordinate point of the sparse set of three-dimensional coordinate points;
   computing a first vector of unit magnitude originating from the nodal point of the camera in a view direction of the camera;
   computing a second vector from a particular three-dimensional coordinate point relative to the respective measurement origin point corresponding to the particular three-dimensional coordinate point;

computing a dot product of the first vector and the second vector; and omitting the particular three-dimensional coordinate point corresponding to the second vector from the subset of three-dimensional coordinate points included in the image segment frustum responsive to the dot product being below a threshold value.

8. The method of claim 1, further comprising:

obtaining a second image segment frustum that includes a second subset of three-dimensional coordinate points fitted to a second image segment;

identifying an intersecting region between the image segment frustum and the second image segment frustum by matching positions of one or more of the three-dimensional coordinate points included in the image segment frustum and one or more of the three-dimensional coordinate points included in the second image segment frustum; and generating a combined image surface by merging the image segment frustum and the second image segment frustum based on the intersecting region.

9. One or more non-transitory computer-readable storage media configured to store instructions that, in response to being executed, cause a system to perform operations, the operations comprising:

obtaining a sparse set of three-dimensional coordinate points representing an environment and an object included in the environment;

obtaining a two-dimensional image of the environment that includes the object, the two-dimensional image being captured from a known position relative to the environment;

segmenting the two-dimensional image into a plurality of image segments;

obtaining a selection of a particular pixel included in the two-dimensional image;

generating an image segment frustum with a shape corresponding to a particular image segment in which the particular pixel is located, the image segment frustum originating from a nodal point of a camera used to capture the two-dimensional image and extending towards the particular pixel from the predetermined and known position;

intersecting the image segment frustum with the sparse set of three-dimensional coordinate points to determine a subset of the sparse three-dimensional coordinates used to fit a derived surface that represents a three-dimensional volume having a surface shape corresponding to the shape of the image segment frustum, the derived surface including a subset of three-dimensional coordinate points that intersects with the image segment frustum; and generating a derived three-dimensional coordinate point that represents a surface point on the object included in the environment within the three-dimensional volume of the derived surface.

10. The one or more non-transitory computer-readable storage media of claim 9, wherein the operations further comprise pairing pixels included in an image segment corresponding to the image segment frustum to the subset of three-dimensional coordinate points and the derived three-dimensional coordinate point included in the derived surface, each pixel being paired with a respective three-dimensional coordinate point of the subset or the derived three-dimensional coordinate point.

11. The one or more non-transitory computer-readable storage media of claim 9, wherein segmenting the two-dimensional image includes detecting a geometry of a particular image segment, the geometry facilitating predicting a shape of an object corresponding to the particular image segment.

12. The one or more non-transitory computer-readable storage media of claim 9, wherein the operations further comprise:

generating a histogram that tabulates distances of the sparse set of three-dimensional coordinate points from the nodal point of the camera; and identifying a peak included in the histogram, the peak representing a concentration of three-dimensional coordinate points above a threshold of point concentration, wherein the subset of three-dimensional coordinate points fitted to the derived surface includes three-dimensional coordinate points included in the peak.

13. The one or more non-transitory computer-readable storage media of claim 12, wherein the operations further comprise:

identifying a first three-dimensional coordinate point included in the peak based on an observation time indicating at which time the first three-dimensional coordinate point is captured, the first three-dimensional coordinate point being included in the subset of three-dimensional coordinate points and the observation time differing by at least a threshold time period from an image observation time; and removing the first three-dimensional coordinate point from the subset of three-dimensional coordinate points.

14. The one or more non-transitory computer-readable storage media of claim 12, wherein the operations further comprise:

identifying a second three-dimensional coordinate point included in the peak based on a depth of the second three-dimensional coordinate point with respect to the nodal point of the camera, the second three-dimensional coordinate point being included in the subset of three-dimensional coordinate points; and removing the second three-dimensional coordinate point from the subset of three-dimensional coordinate points responsive to determining that the depth of the second three-dimensional coordinate point is greater than a threshold depth value.

15. The one or more non-transitory computer-readable storage media of claim 9, wherein the operations further comprise:

determining a respective measurement origin point corresponding to each respective three-dimensional coordinate point of the sparse set of three-dimensional coordinate points;

computing a first vector of unit magnitude originating from the nodal point of the camera in a view direction of the camera;

computing a second vector from a particular three-dimensional coordinate point relative to the respective measurement origin point corresponding to the particular three-dimensional coordinate point;

computing a dot product of the first vector and the second vector; and omitting the particular three-dimensional coordinate point corresponding to the second vector from the subset of three-dimensional coordinate points included in the image segment frustum responsive to the dot product being below a threshold value.

16. The one or more non-transitory computer-readable storage media of claim 9, wherein the operations further comprise:

obtaining a second image segment frustum that includes a second subset of three-dimensional coordinate points fitted to a second image segment;

identifying an intersecting region between the image segment frustum and the second image segment frustum by matching positions of one or more of the three-dimensional coordinate points included in the image segment frustum and one or more of the three-dimensional coordinate points included in the second image segment frustum; and generating a combined image surface by merging the image segment frustum and the second image segment frustum based on the intersecting region.

17. A system, comprising:

one or more processors; and one or more non-transitory computer-readable storage media configured to store instructions that, in response to being executed, cause the system to perform operations, the operations comprising:

obtaining a sparse set of three-dimensional coordinate points representing an environment and an object included in the environment;

obtaining a two-dimensional image of the environment that includes the object, the two-dimensional image being captured from a known position relative to the environment;

segmenting the two-dimensional image into a plurality of image segments;

obtaining a selection of a particular pixel included in the two-dimensional image;

generating an image segment frustum with a shape corresponding to a particular image segment in which the particular pixel is located, the image segment frustum originating from a nodal point of a camera used to capture the two-dimensional image and extending towards the particular pixel from the predetermined and known position;

intersecting the image segment frustum with the sparse set of three-dimensional coordinate points to determine a subset of the sparse three-dimensional coordinates used to fit a derived surface that represents a three-dimensional volume having a surface shape corresponding to the shape of the image segment frustum, the derived surface including a subset of three-dimensional coordinate points that intersects with the image segment frustum; and generating a derived three-dimensional coordinate point that represents a surface point on the object included in the environment within the three-dimensional volume of the derived surface.

18. The system of claim 17, wherein the operations further comprise pairing pixels included in an image segment corresponding to the image segment frustum to the subset of three-dimensional coordinate points and the derived three-dimensional coordinate point included in the derived surface, each pixel being paired with a respective three-dimensional coordinate point of the subset or the derived three-dimensional coordinate point.

19. The system of claim 17, wherein segmenting the two-dimensional image includes detecting a geometry of a particular image segment, the geometry facilitating predicting a shape of an object corresponding to the particular image segment.

20. The system of claim 17, wherein the operations further comprise:

generating a histogram that tabulates distances of the sparse set of three-dimensional coordinate points from the nodal point of the camera; and identifying a peak included in the histogram, the peak representing a concentration of three-dimensional coordinate points above a threshold of point concentration, wherein the subset of three-dimensional coordinate points fitted to the derived surface includes three-dimensional coordinate points included in the peak.

21. The system of claim 20, wherein the operations further comprise:

identifying a first three-dimensional coordinate point included in the peak based on an observation time indicating at which time the first three-dimensional coordinate point is captured, the first three-dimensional coordinate point being included in the subset of three-dimensional coordinate points and the observation time differing by at least a threshold time period from an image observation time; and removing the first three-dimensional coordinate point from the subset of three-dimensional coordinate points.

22. The system of claim 20, wherein the operations further comprise:

identifying a second three-dimensional coordinate point included in the peak based on a depth of the second three-dimensional coordinate point with respect to the nodal point of the camera, the second three-dimensional coordinate point being included in the subset of three-dimensional coordinate points; and removing the second three-dimensional coordinate point from the subset of three-dimensional coordinate points responsive to determining that the depth of the second three-dimensional coordinate point is greater than a threshold depth value.

23. The system of claim 17, wherein the operations further comprise:

determining a respective measurement origin point corresponding to each respective three-dimensional coordinate point of the sparse set of three-dimensional coordinate points;

computing a first vector of unit magnitude originating from the nodal point of the camera in a view direction of the camera;

computing a second vector from a particular three-dimensional coordinate point relative to the respective measurement origin point corresponding to the particular three-dimensional coordinate point;

computing a dot product of the first vector and the second vector; and omitting the particular three-dimensional coordinate point corresponding to the second vector from the subset of three-dimensional coordinate points included in the image segment frustum responsive to the dot product being below a threshold value.

24. The system of claim 17, wherein the operations further comprise:

obtaining a second image segment frustum that includes a second subset of three-dimensional coordinate points fitted to a second image segment;

identifying an intersecting region between the image segment frustum and the second image segment frustum by matching positions of one or more of the three-dimensional coordinate points included in the image segment frustum and one or more of the three-dimensional coordinate points included in the second image segment frustum; and generating a combined image surface by merging the
   image segment frustum and the second image segment
   frustum based on the intersecting region.

* * * * *